Patented Dec. 17, 1940

2,225,553

UNITED STATES PATENT OFFICE 2,225,553

TREATING DAIRY PRODUCTS

Victor Conquest, Chicago, and Willard Turner, Elgin, Ill., assignors to Armour and Company, Chicago, Ill., a corporation of Illinois No Drawing. Application January 6, 1939, Serial No. 249,658

4 Claims. (Cl. 99—151)

This invention relates to processes of treating dairy products and it comprises processes wherein milk or cream is treated with a very small amount of a pancreatic enzyme material to prevent the development of off-odor and flavor in the milk or cream, the amount of pancreatic enzyme material added being insufficient to substantially change the curd tension of the milk.

In the Conquest Patent 2,115,505 there is described and claimed the addition of small amounts of pancreatic enzymes to whole milk for the purpose of preparing a soft-curd milk having a very low curd tension. The subject matter of that patent is based upon the discovery that pancreatic enzymes, when used in the amounts stated, will lessen the curd tension of whole milk.

The curd tension of a normal milk varies from about 35 to 65 grams as measured on the Hill curdometer. The amount of pancreatic enzyme added in the aforesaid patent carries with the curd tension ultimately desired in the final milk. This curd tension is always much less than the curd tension of the milk prior to treatment. As described in the patent, one pound of enzymes is added to from 5,000 to 40,000 pounds of milk for the purpose of substantially reducing the curd tension of the milk and thus forming a so-called soft-curd milk.

Milk and cream, and products made therefrom, such as butter, tend to develop off-odors and poor flavor. The odor is commonly referred to as cardboardy, oxidized or hay-like. The cardboardy flavor problem is a disturbing factor in the dairy industry. Fresh whole milk having a sweet odor and flavor may develop so-called cardboardy characteristics after the milk has been pasteurized. These off-odors and flavors frequently develop in the milk between the time of collection and the time of distribution to the consumer. The problem is an important one and hitherto no satisfactory solution has been proposed.

We have now discovered that the addition of exceedingly small amounts of pancreatic enzymes to milk or cream prior to the development of any off-odor and flavor will completely prevent those normal changes in milk or cream yielding cardboardy flavor and odor characteristics.

The present invention is to be distinguished, however, from the aforesaid patent. In the present invention we process the milk or cream with pancreatic enzymes but we use such exceedingly small amounts of enzymes that substantially no change in the normal curd tension of the milk is effected. After treatment with pancreatic enzymes for the very special purpose of the present invention the milk will have a curd tension not substantially lowered. Its curd tension will, on the average, be not less than 35 grams, which to the dairy specialist would class the milk as moderately hard curd. The amount of pancreatic enzymes which we use to achieve the results of the present invention is much less than that used in the aforesaid patent. Expressed in terms of result, the amount of pancreatic enzymes used is enough to protect the milk or cream from the development of cardboardy odor characteristics but insufficient to substantially modify the curd tension. Whereas in the aforesaid patent the greatest ratio of enzyme to milk is about one pound of enzyme to 40,000 pounds of milk, in the present case one pound of enzyme is used to treat not less than 70,000 pounds of milk and frequently the amount of milk to a pound of enzymes is 140,000 to 150,000 pounds. When using these small amounts of pancreatic enzyme with such large volumes of milk no substantial change in the curd tension will be observed, but the cardboardy odor and flavor characteristics are prevented from developing.

In consequence, the present invention is of significant importance to the art. It means that milk or cream can be collected, pasteurized, bottled, and distributed without fear of spoilage, although the art will, of course, recognize that by the development of poor taste and odor we do not mean that the milk has definitely soured or undergone profound bacteriological changes. Moreover, the present invention prevents the development of undesirable flavor or odor in products made from milk or cream. If cream which has a hay flavor or odor is churned to butter in the usual way the butter also has the objectionable odor of the cream. Butter churned from apparently sweet cream sometimes develops this odor later. But if the enzymes are added to the sweet cream before churning, the butter will not develop this undesirable characteristic. Frequently, dried whole milk powder made either from sweet milk or milk which has developed poor odor and taste will retain these undesirable characteristics in the dried product. The addition of the enzymes in accordance with the present invention to the milk before the cardboardy characteristics have developed therein completely prevents undesirable changes in the dried milk. Similar improvement is found in the case of ice cream mixes and in cheese.

In substance then, the present invention completely protects milk and milk products from the development of off-odor and taste, without affecting the curd tension of the milk in any significant way.

In practice the process steps of the present invention are easily performed. All we need do is add to fresh milk or cream, or skim milk, exceedingly small amounts of pancreatic enzymes, the amounts not exceeding one pound of pancreatice enzyme for at least 70,000 pounds of milk, and in any event, in quantities insufficient to substantially modify the curd tension of the milk. Thus we add to fresh cows' milk or cream separated therefrom, about one pound of pancreatic enzyme material for each 70,000 pounds of milk or cream. The mixture is maintained at a temperature of about 40° to 50° F. for a period of time varying from a few minutes up to several hours. The time does not appear to be critical. Thereafter the milk or cream can be pasteurized, or made into cheese, or in the case of cream, churned to butter. Instead of treating the milk or cream at a temperature of about 40° to 50° F. we can operate at moderately higher temperatures. Holding temperatures as high as 90° F. to 100° F. can be used, and the product thereafter pasteurized.

The present invention is also to be distinguished from other patents wherein pancreatic enzymes are added for the purpose of substantially modifying the casein content of the milk. Enzymes, when used in larger quantities, will cause hydrolysis or digestion of the protein. This is definitely avoided in the present invention. The milk of the present invention undergoes no changes in mineral values.

By pancreatic enzyme material we mean to include pancreatin alone as well as mixtures of pancreatin and other enzymes associated therewith when aqueous or alcoholic extracts of the pancreas are prepared or the dried pancreas is processed to remove substantially all of the fat and lipase.

Having thus described our invention, what we claim is:

1. The process of treating dairy products chosen from the group consisting of milk and cream to prevent development of off-odors and flavors commonly referred to as cardboardy, oxidized or hay-like therein, which comprises adding to such dairy products small amounts of pancreatic enzyme material, the amount thereof being of the order of one pound of enzyme material to at least 70,000 pounds of milk or cream and being insufficient to substantially modify the curd tension of the milk, or to modify the cream other than in respect to the development of such odors and flavors.

2. The process as in claim 1 wherein the amount of enzyme material added varies from about one pound of enzyme material to 70,000 pounds to 140,000 pounds of milk.

3. In the manufacture of dairy products from milk, the method of preventing therein the development of off-odor and flavor commonly referred to as cardboardy, oxidized or hay-like which comprises adding to the fresh milk exceedingly small amounts of pancreatic enzyme material, of the order of one pound of enzyme material to at least 70,000 pounds of milk, the amount of enzyme material being insufficient to substantially change the curd tension of the milk.

4. The process as in claim 1 wherein the dairy product treated is fresh milk before pasteurization thereof.

VICTOR CONQUEST.
WILLARD TURNER.